(12) United States Patent
Luss (10) Patent No.: US 8,019,576 B2
(45) Date of Patent: Sep. 13, 2011

(54) METHOD FOR PLACEMENT OF SENSORS FOR SURVEILLANCE

(75) Inventor: Hanan Luss, Marlboro, NJ (US)

(73) Assignee: Telcordia Licensing Company, LLC, Piscataway, NJ (US)

(*) Notice: Subject to any disclaimer, the term of this patent is extended or adjusted under 35 U.S.C. 154(b) by 1211 days.

(21) Appl. No.: 11/725,794

(22) Filed: Mar. 20, 2007

(65) Prior Publication Data
US 2008/0198004 A1    Aug. 21, 2008

Related U.S. Application Data

(60) Provisional application No. 60/901,909, filed on Feb. 16, 2007.

(51) Int. Cl.
G06F 17/50 (2006.01)
G06F 7/60 (2006.01)
G01S 13/00 (2006.01)
H04B 7/00 (2006.01)

(52) U.S. Cl. ............... 703/2; 703/1; 702/32; 342/75; 370/310

(58) Field of Classification Search ............ 703/1, 2; 702/32; 342/75; 370/310
See application file for complete search history.

(56) References Cited

U.S. PATENT DOCUMENTS

| | | | |
|---|---|---|---|
| 6,212,471 B1* | 4/2001 | Stiles et al. | 701/207 |
| 6,297,763 B1* | 10/2001 | Thomson et al. | 342/75 |
| 7,091,902 B2* | 8/2006 | Liu et al. | 342/174 |
| 7,275,014 B1* | 9/2007 | Koren et al. | 702/150 |
| 7,490,014 B1* | 2/2009 | Koren et al. | 702/94 |
| 2005/0134499 A1* | 6/2005 | Liu et al. | 342/75 |
| 2005/0153704 A1 | 7/2005 | Luss et al. | |
| 2006/0142978 A1* | 6/2006 | Suenbuel et al. | 703/1 |
| 2006/0152355 A1 | 7/2006 | Suenbuel et al. | |

OTHER PUBLICATIONS

Dhillon et al. "Sensor Placement for Effective Coverage and Surveillance in Distributed Sensor Networks", IEEE 2003.*
Bushan et al. "Comprehensive Design of a Sensor Netowrk for Chemical Plants Based on Various Diagnosability and Reliability Criteria.", Ind. Eng. Chim. Res. 2001, 41, 1826-1839.*
Arora, et al. "A line in the sand: a wireless sensor network for target detection, classification, and tracking", Computer Netowrks 46 (2004) 605-634.*

(Continued)

Primary Examiner — Kamini S Shah
Assistant Examiner — Shambhavi Patel
(74) Attorney, Agent, or Firm — Fitch Even Tabin & Flannery (57) ABSTRACT

A limited number of sensors are placed at selected locations in order to achieve equitable coverage levels to all locations that need to be monitored. The coverage level provided to any specific location depends on all sensors that monitor the location and on the properties of the sensors, including probability of object detection and probability of false alarm. These probabilities may depend on the monitoring and monitored locations. An equitable coverage to all locations is obtained by finding the lexicographically largest vector of coverage levels, where these coverage levels are sorted in a non-decreasing order. The method generates a lexicographic maximin optimization model whose solution provides equitable coverage levels. In order to facilitate computations, a nonlinear integer optimization model is generated whose solution provides the same coverage levels as the lexicographic maximin optimization model. Solution of the nonlinear integer optimization model is obtained through the adaptation of known optimization methods.

34 Claims, 3 Drawing Sheets

OTHER PUBLICATIONS

Ghosh, Amitabha. "Estimating Coverage Holes and Enhancing Coverage in Mixed Sensor Networks", Proceedings of the 29th Annual IEEE International Conference on Local Computer Networks (LCN'04).*

Efrat et al. "Approximation Algorithms for Two Optimal Location Problems in Sensor Networks", IEEE 2005.*

Mao et al. "Coordinated Sensor Deployment for Improving Secure Communications and Sensor Coverage", ACM Nov. 2005.*

Wang et al. "Integrated Coverage and Connectivity Configuration in Wireless Sensor Networks", ACM 2003.*

Tang et al. "Optimization of Detection Networks: Part II—Tree Structures", IEEE 1993.*

Zou, Yi. "Coverage-Driven Sensor Deployment and Energy-Efficient Information Processing in Wireless Sensor Networks", 2004.*

Linda V. Green, Peter J. Kolesar, "Improving Emergency Responsiveness With Management Science", Management Science, vol. 50, No. 8, Aug. 2004, pp. 1001-1014.

Wlodzimierz Ogryczak, "On the Lexicographic Minimax Approach to Location Problems", European Journal of Operational Research, vol. 100, 1997, pp. 566-585.

Krishnendu Chakrabarty, S. Sitharama Iyengar, Hairong Qi and Eungchun Cho, "Grid Coverage for Surveillance and Target Location in Distributed Sensor Networks", IEEE Transactions on Computers, vol. 51, No. 12, Dec. 2002, pp. 1448-1453.

Hanan Luss, "On Equitable Resource Allocation Problems: A Lexicographic Minimax Approach", Operations Research; May/Jun. 1999; 47,3; ABI/INFORM Global, pp. 361-378.

Toshihide Ibaraki and Naoki Katoh, "Resource Allocation Problems Algorithmic Approaches", 1988, pp. 37-47, The MIT Press.

Colin R. Reeves, Modern Heuristic Techniques for Combinatorial Problems, 1993, Halsted Press, pp. v-ix.

International Search Report, dated May 20, 2008 (2 pages).

\* cited by examiner

METHOD FOR PLACEMENT OF SENSORS FOR SURVEILLANCE

CROSS-REFERENCE TO RELATED APPLICATIONS

This application claims the benefit of U.S. Provisional Patent Application No. 60/901,909, filed Feb. 16, 2007, which is hereby incorporated herein by reference in its entirety.

FIELD OF INVENTION

The present invention relates to optimal placement of a limited number of sensors at selected locations in order to provide adequate protection to all locations.

BACKGROUND OF THE INVENTION

The use of sensors to provide effective surveillance of wide areas is becoming increasingly common. Consider a specified area where harmful objects may be placed, such as explosives, biological agents, or chemical substances. A fixed number of sensors are installed throughout the area, where each of these sensors provides observations on one or more locations within the area. The observations of these sensors are combined through a data fusion process in order to assess whether an object is actually present at one or more of the observed locations or not. Since the number of sensors that can be placed is limited, it is critically important to determine optimal locations for these sensors. In some applications, many sensors may be installed, but only a limited number of these sensors can be activated simultaneously.

Sensors are also used for intrusion detection. Defense against intrusion may be necessary to protect large areas like a border between countries, oil and gas pipelines, strategic facilities like nuclear reactors, industrial complexes, military bases, etc. Again, placing the sensors optimally is vitally important in order to achieve appropriate protection against intruders who might approach the protected area from different directions.

A related topic focuses on the optimal location of emergency facilities, such as emergency rooms, fire departments, and police stations. It is convenient to represent an area by a network, where each node represents a neighborhood, e.g., a square of dimension 100×100 meters. A link interconnecting a pair of nodes represents possible movement from one node to the other and the link metric represents the distance (or travel time) between the end-nodes. A typical problem is to place a limited number of emergency facilities at a subset of these nodes so that the distance (or travel time) from any node to the closest facility is minimized. This is a well-known problem in the literature, referred to as the network minimax location problem or the vertex center problem. A related problem, known in the literature as the set covering problem, minimizes the cost of installing facilities at a subset of the nodes so that each of the nodes is within a specified distance (or travel time) from the closest facility. L. V. Green and P. J. Kolesar, "Improving Emergency Responsiveness with Management Science", *Management Science,* 50, 1001-1014, 2004 present the state-of-the-art of emergency responsiveness models.

The optimal locations of emergency facilities under the network minimax location problem are not unique as there may be numerous solutions that provide the best possible service to the worst-off location. Hence, it would be attractive to find which solution from among all minimax solutions should be selected. W. Ogryczak, "On the Lexicographic Minimax Approach to Location Problems", *European Journal of Operational Research,* 100, 566-585, 1997 presents an algorithm to find a lexicographic minimax solution to the location problem. As in the minimax network location problem, any specific location is served by a single facility, specifically, by the closest facility to that location. The lexicographic minimax solution is the best minimax solution in the sense that ordering the service provided to the locations (in terms of distance or travel time from closest facility) from the worst to the best, the resulting ordered vector is the lexicographically smallest possible ordered vector. Such a solution is referred to as an equitable solution.

K. Chakrabarty, S. S. Iyengar, H. Qi, and E. Cho, "Grid Coverage for Surveillance and Target Location in Distributed Sensor Networks," *IEEE Transactions on Computers,* 51, 1448-1453, 2002 formulate a sensor location problem as a set covering problem which minimizes the cost of installing sensors at a subset of the nodes so that each of the nodes is within a specified distance (or travel time) from a specified number of sensors.

This invention focuses on placing a limited number of sensors in order to achieve an equitable coverage of all locations, using a lexicographic maximin objective. The coverage level provided to any specific location may depend on the locations of multiple sensors that monitor the location and on the properties of the sensors. This is a significant extension of the paper above by W. Ogryczak, and the method used there cannot be extended to solve the problem addressed by this invention. H. Luss, "On Equitable Resource Allocation Problems: A Lexicographic Minimax Approach", *Operations Research,* 47, 361-378, 1999 provides an exposition of various equitable resource allocation models and solution methods; however, none of these can be applied to this invention.

SUMMARY OF INVENTION

The present invention focuses on placing a limited number of sensors at selected locations in order to achieve equitable coverage levels to all locations that need to be monitored. The area under surveillance is represented as a network where the nodes represent locations and the interconnecting links indicate surveillance relations. Consider a sensor at node j. In addition to monitoring node j, a link from node j to node i means that a sensor at node j can also monitor node i. The coverage level provided to any specific location depends on all sensors that monitor that location and on the properties of the sensors. The properties of a sensor include the probability of detecting a target at a specified location when a target is present at that location and the probability of erroneously detecting a target at same location when a target is not present there. These probabilities may be different for each (i, j) node-pair.

Suppose the locations of the sensors are specified. Given these locations, the coverage level offered to each location is computed. Consider the vector of the coverage levels offered to each of the locations where the elements of this vector (i.e., the coverage levels) are sorted in a non-decreasing order. Equitable coverage levels to all locations are specified as the lexicographically largest such ordered vector of coverage levels. The invention determines optimal locations of a limited number of sensors so that equitable coverage levels to all locations are achieved. The invention generates the equitable sensor location model as a lexicographic maximin optimization model whose solution provides equitable coverage levels to all locations. Current state-of-the-art of optimization solvers cannot directly solve said lexicographic maximin optimization model. The invention generates a nonlinear integer optimization model whose solution would also provide equitable, or near-equitable, coverage levels to all locations. Solution of said nonlinear integer optimization model can be obtained through the adaptation of known optimization methods, such as dynamic programming and various meta-heuristics, including simulated annealing and tabu search. The sensor location model can be part of a system used in a static (one time) situation or a dynamic (multi-period) situation. In a dynamic situation, sensor locations are periodically changed to prevent learning of the locations by an adversary.

The present invention will be more clearly understood when the following description is read in conjunction with the accompanying drawings.

DETAILED DESCRIPTION

Figure 1:
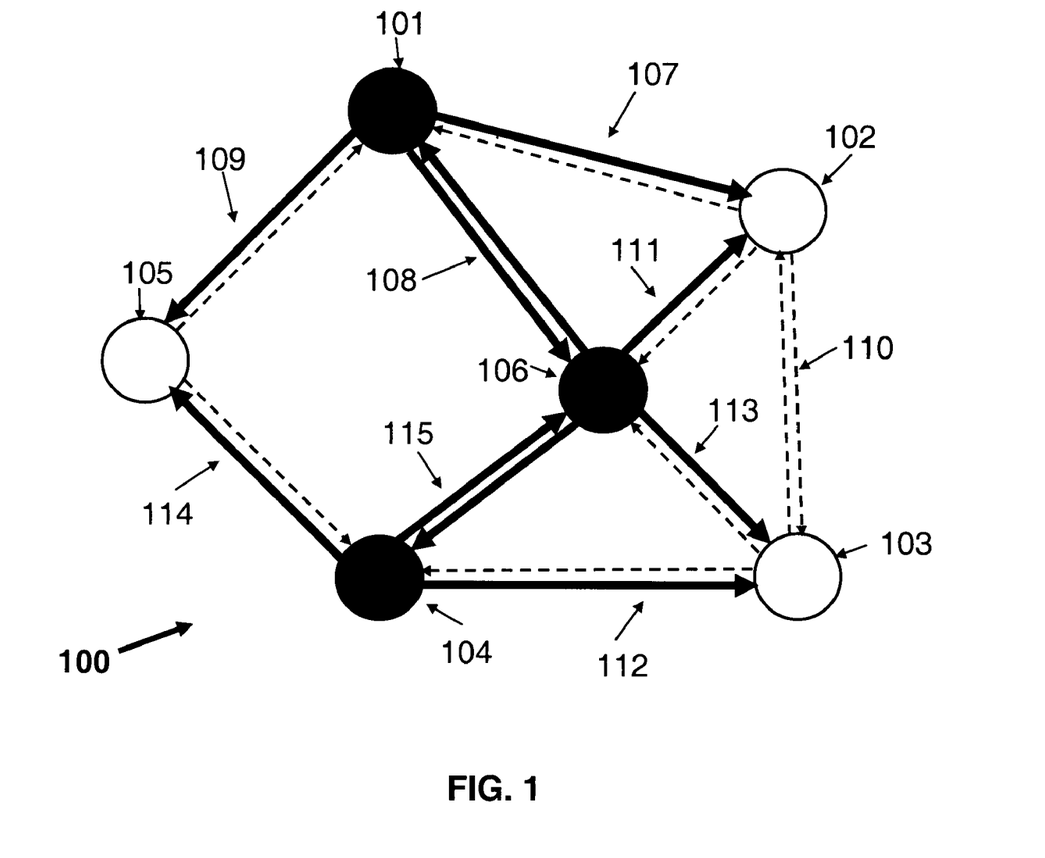
FIG. 1 illustrates a network representation of the sensor location model.

Referring now to the figures and FIG. 1 in particular, there is shown an example of a network 100 representing an area under surveillance. The area is represented by six nodes 101-106. Three sensors are located as represented by the nodes in black 101, 104 and 106. The optimal location of the sensors will be determined in accordance with the teachings of the present invention. The directed links 107-115 represent surveillance relations. For example, 107 represents surveillance relations from node 101 to node 102 (shown by the solid directed link) and from node 102 to node 101 (shown by the dashed directed link). The solid directed link indicates that indeed node 101 has a sensor that monitors node 102. The dashed directed link indicates that node 102 could have monitored node 101 if a sensor had been placed at node 102. Note that, for example, the sensor at node 101 monitors nodes 101, 102, 105 and 106 and that node 101 is monitored by the sensors at nodes 101 (a sensor always monitors the node in which it is located) and 106.

The following notation is used:

N=Set of nodes that need to be monitored. Nodes in N are indexed by i. In FIG. 1, N={101, 102, 103, 104, 105, 106). In practical situations N may be large where the specific value depends on the area size and on the area represented by a node. For instance, if the area under surveillance is a square of 10 km×10 km and each node represents a square of 100 m×100 m, N=10,000.

S=Set of nodes where sensors can be located. Nodes in S are indexed by j. Although in example 100 it is assumed that S=N, the sets N and S may not be the same.

J(i)=Subset of nodes in S that can monitor node i. The set J(i) includes all nodes that have a link directed into node i plus, if i∈S, node i itself. For example, in FIG. 1 J(101)={101, 102, 105, 106} and J(102)={101, 102, 103, 106}.

The present invention provides a method that determines optimal locations when the number of available sensors is limited. Although the sensors are assumed to be identical, the coverage level that a sensor placed at node j provides to node i depends on the sensor properties and on the specified nodes i and j. The sensor properties are typically specified through the following probabilities:

$p_{ij}$=Probability that a sensor at node j detects an object at node i, given that there is an object at node i.

$q_{ij}$=Probability that a sensor at node j erroneously detects an object at node i, given there is not an object at i (false alarm). We assume that $q_{ij} < p_{ij}$.

The coverage level provided to location i is determined based on all sensors located at nodes that are in set J(i). An optimal solution to the sensor location problem will be a solution that provides equitable coverage to all nodes in N. An equitable coverage solution will be defined later.

Figure 2:
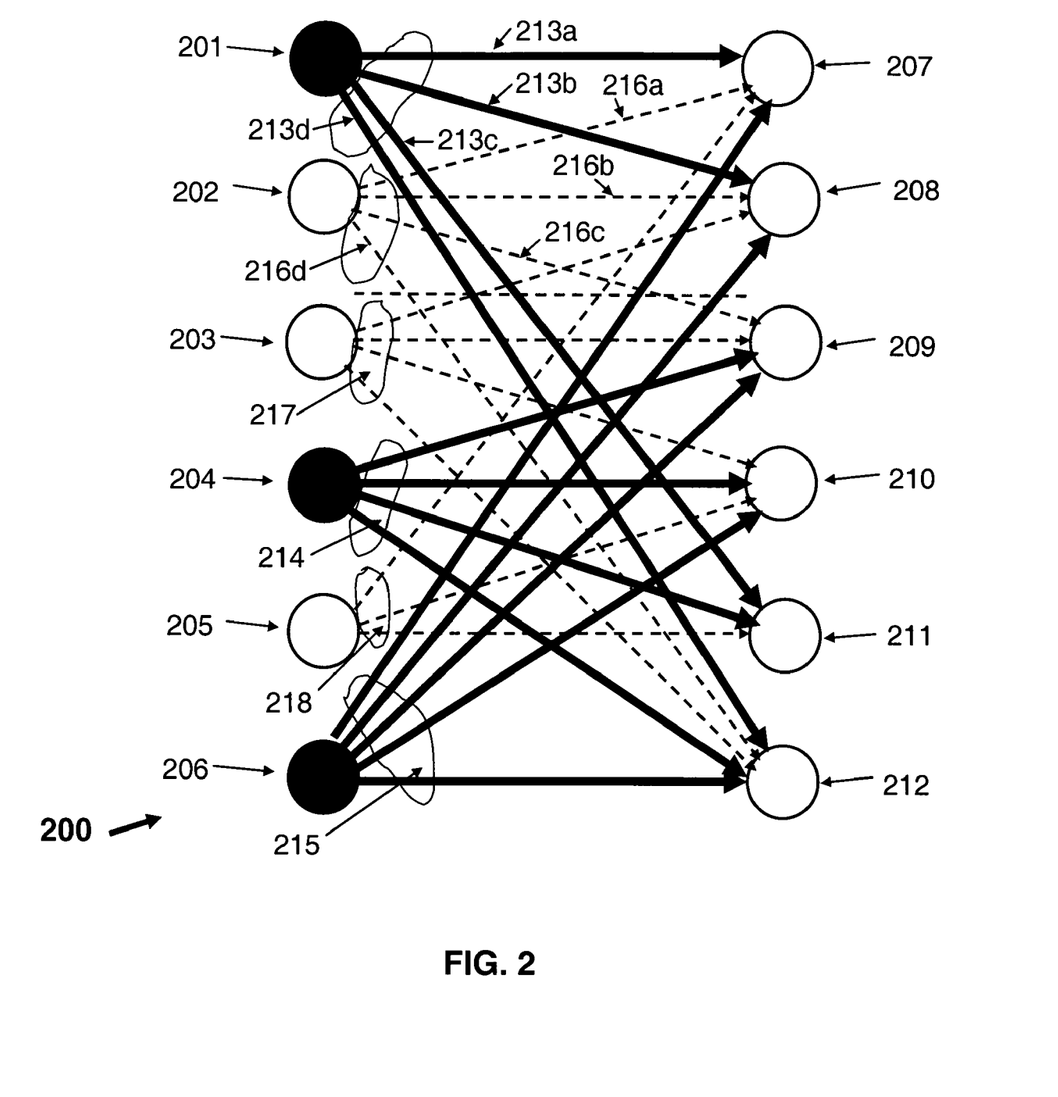
FIG. 2 illustrates a bipartite network representation of the sensor location model.

In FIG. 2 there is shown example of a different network 200 representation of the sensor location model wherein the model is shown as a bipartite network. Nodes 201-206 are the set of nodes S where sensors can be placed. These nodes correspond to nodes 101-106 in network 100. Sensors are located in network 200 at nodes 201, 204 and 206 (nodes in black), corresponding to sensor locations at nodes 101, 104 and 106 in network 100. Each of the nodes 201-206 is duplicated on the right side of network 200. Thus, node 207 is a duplicate of node 201, node 208 is a duplicate of node 202, etc. Nodes 207-212 represent the set of nodes N that needs to be monitored. Although in this example the sets N and S include the same nodes (same assumption as made in network 100), this need not be the case. If S and N are not the same, some nodes in S may not have duplicate nodes in N and some nodes in N may not have corresponding nodes in S. The links in network 200 indicate surveillance relations. Thus, for example, node 201 has links 213a-d to nodes 207, 208, 211 and 212, respectively, and node 202 has links 216a-d to nodes 207, 208, 209 and 212, respectively. These links have obvious one-to-one correspondence to links in network 100 with the addition of a link from a node in set S to its duplicate node in set N. Note that the solid links connect a node with a sensor to the relevant nodes in N and the dashed links connect a node without a sensor to the relevant nodes in N. The sets J(i) are readily derived from network 200, for example J(207)={201, 202, 205, 206}. Hence, in this example node 207 is monitored by two sensors in nodes 201 and 206}. Note that J(207) corresponds uniquely to J(101)={101, 102, 105, 106} in network 100 where node 101 is monitored by the two sensors at nodes 101 and 106.

Figure 3:
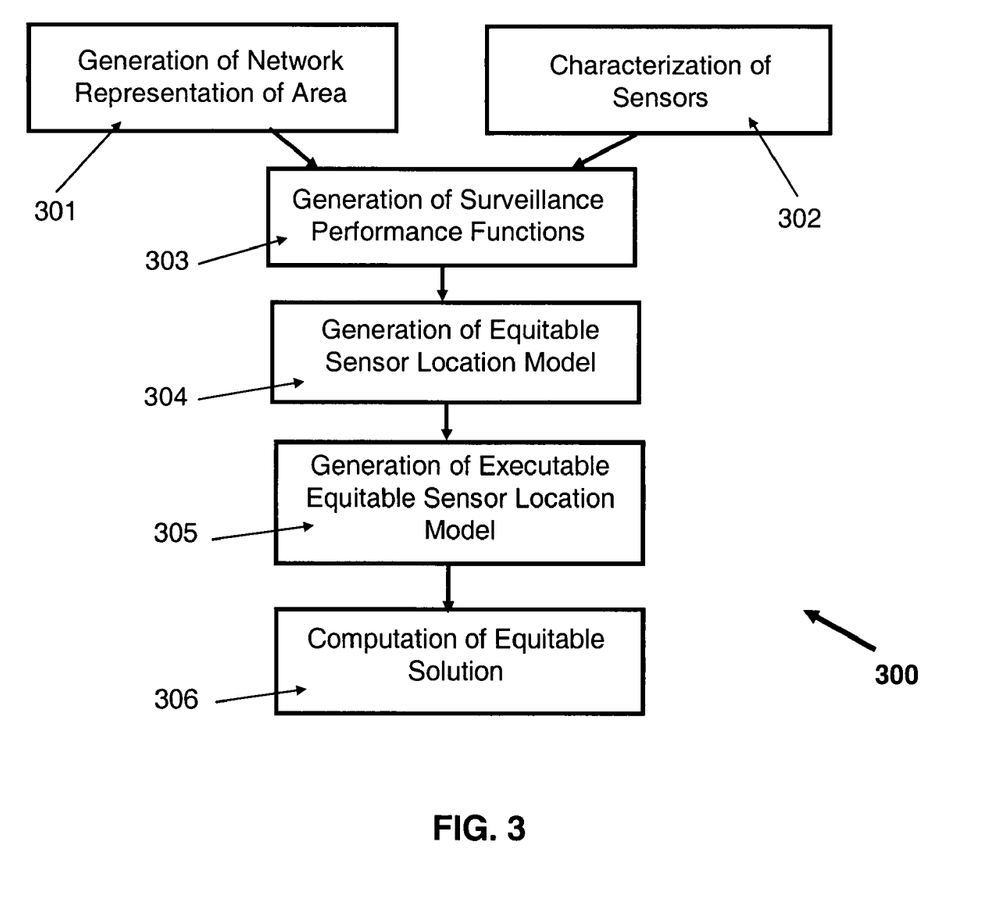
FIG. 3 is a flow chart of a method for determining sensor locations that provide equitable coverage levels to all locations.

FIG. 3 presents a flow chart of a method 300 for determining sensor locations that provide equitable coverage levels to all locations.

Input Preparation to the Method (Steps 301 and 302)

A network representation of the specified area is generated 301, as explained above with reference FIGS. 1 and 2. The number of nodes in the network depends on the area size and on the area represented by a single node. The required accuracy depends upon the specific applications. Characterization of properties of the sensors that would affect quality of surveillance is specified 302. These properties may include, but are not limited to, probabilities $p_{ij}$ and $q_{ij}$. Although all sensors are assumed to be of the same type, note that these probabilities depend on the sensor location and the monitored location. Different probabilities from different sensor locations may result from different distances of these locations to node i or from some obstacles between these locations and nodes i. The network representation (either the network 100 of FIG. 1 or the network 200 of FIG. 2) and the properties of the sensors are the primary inputs to the sensor location model.

Generation of Surveillance Performance Functions (Step 303)

The goal of the method is to determine optimal locations of a limited number of available sensors. Let $x_j$=Decision variable. $x_j=1$ if a sensor is located at node j and $x_j=0$ otherwise. Let x be the vector of all decision variables $x_j$, j∈S.

$f_i(x)$=Surveillance performance function for node i, i∈N. For a specific value of the vector x, resulting value of this function is also referred to as the coverage level provided to node i. Note that the only decision variables $x_j$ that affect $f_i(x)$ are those for which j∈J(i).

Two examples are provided below for possible surveillance performance functions. The invention is not limited to these specific performance functions.

EXAMPLE 1

Suppose all probabilities $q_{ij}=0$ and $0<p_{ij}<1$. Then, the surveillance performance function for node i, as a function of x, can be set to the probability that an object at node i will be detected by at least one sensor. This implies $$f_i(x) = 1 - \prod_{x_j=1, j \in J(i)} (1-p_{ij}), \; i \in N, \text{ where } \prod_{\phi}(\cdot) = 1. \quad (1)$$

The value of $f_i(x)$ for a specified x is referred to as the coverage level provided to node i; the larger the value of $f_i(x)$, the better is the coverage level provided to node i. Note that equation (1) can also be written as $$f_i(x) = 1 - \prod_{j \in J(i)} (1-p_{ij})^{x_j}, \; i \in N.$$

EXAMPLE 2

Suppose all probabilities $q_{ij}$ satisfy $0<q_{ij}<p_{ij}$. Then, the effectiveness of a sensor t location j for detecting an object at location i can be estimated by the ratio $(1-p_{ij})/(1-q_{ij})$; the smaller this ratio, the more effective the sensor. Obviously, if $q_{ij}$ is about equal to $p_{ij}$, placing a sensor at node j to monitor node i is useless as the collected information from that sensor would not provide any meaningful information. Note that $$\prod_{x_j=1, j \in J(i)} (1-p_{ij})$$

is the conditional probability that none of the sensors that monitor node i would detect an object at node i given that there is an object at node i, and $$\prod_{x_j=1, j \in J(i)} (1-q_{ij})$$

is the conditional probability that none of the sensors that monitor node i would erroneously detect an object at node i given that there is no object at node i. Similarly to equation (1), one minus the ratio of these conditional probabilities can be selected to form the following surveillance performance function.

$$f_i(x) = 1 - \prod_{x_j=1, j \in J(i)} \frac{1-p_{ij}}{1-q_{ij}}, \; i \in N, \text{ where } \prod_{\phi}(\cdot) = 1. \quad (2)$$

Note that equation (2) can also be written as $$f_i(x) = 1 - \prod_{j \in J(i)} \left(\frac{1-p_{ij}}{1-q_{ij}}\right)^{x_j}, \; i \in N.$$

Various other surveillance functions can be used. Consider a specific i, and let $x^1$ and $x^2$ be two vectors where $x^1_j \leq x^2_j$ for all j∈J(i) and $x^1_j < x^2_j$ for at least one j∈J(i). The surveillance performance functions should satisfy the following properties:

Property (i)
The function $f_i(x)$ is increasing with variables j∈J(i), i.e., $f_i(x^1) < f_i(x^2)$.

Property (ii)
Suppose some variable j∈J(i) that is 0 in $x^1$ and in $x^2$ is set to 1 in both $x^1$ and $x^2$, resulting vectors $x^{1+}$ and $x^{2+}$, respectively. Then, $f_i(x^{1+}) - f_i(x^1) \geq f_i(x^{2+}) - f_i(x^2)$; i.e., $f_i(x)$ is concave on the integer values of $x_j$ for j∈J(i).

Note that properties (i) and (ii) hold for equations (1) and (2).

Generation of Equitable Sensor Location Model—ESLM (Step 304)

The model is formulated with surveillance performance functions $f_i(x)$ for i∈N.

Let
$f^{(n)}(x)$=Vector of all $f_i(x)$'s, sorted in non-decreasing order, that is, $$f^{(n)}(x) = [f_{i_1}(x), f_{i_2}(x), \ldots, f_{i_{|N|}}(x)], \quad (3.a)$$

where $$f_{i_1}(x) \leq f_{i_2}(x) \leq \ldots \leq f_{i_{|N|}}(x). \quad (3.b)$$

P=Number of sensors available, P<|S|. These sensors are placed at a subset of the nodes in the set of nodes S, at most one sensor per node. The case P≥|S| need not be considered as it results in a trivial problem where a sensor is placed at each of the nodes in the set S.

An equitable solution is a solution that provides the lexicographic largest vector $f^{(n)}(x)$. The Equitable Sensor Location Model, referred to as ESLM, is formulated as a lexicographic maximin optimization model.

ESLM $$V^f = \text{lex}\max_x [f^{(n)}(x)] \quad (4.a)$$

So that $$f^{(n)}(x) = [f_{i_1}(x), f_{i_2}(x), \ldots, f_{i_{|N|}}(x)], \quad (4.b)$$

$$f_{i_1}(x) \leq f_{i_2}(x) \leq \ldots \leq f_{i_{|N|}}(x), \quad (4.c)$$

$$\sum_{j \in S} x_j = P, \quad (4.d)$$

$$x_j = 0, 1, \; j \in S. \quad (4.e)$$

Objective function (4.a) finds the lexicographic largest vector $V^f$, where by statements (4.b) and (4.c) this vector comprises all surveillance performance functions $f_i(x)$ sorted in a non-decreasing order. Constraints (4.d) and (4.e) limit the number of placed sensors to P where at each node of the set S at most one sensor is placed. As discussed above, examples of surveillance performance functions are given in equations (1) and (2). ESLM is independent of the specific form used for the surveillance performance functions as long as these functions are increasing (property (i) in step 303)

Generation of Executable Equitable Sensor Location Model (Step 305)

Although ESLM provides a complete and accurate formulation for computing equitable solutions, this formulation cannot be solved directly by known optimization methods.

Since, as discussed above, it is assumed that each of the surveillance performance functions $f_i(x)$ for i∈N is an increasing function and concave on the integer values of $x_j$ for j∈ J(i) (as specified by properties (i) and (ii) in step 303), an equitable solution (a lexicographic maximin solution) will be obtained by solving a related nonlinear integer optimization model. Note that the surveillance performance functions specified in equations (1) and (2) are given for illustrative purposes only; all that is required is that the functions satisfy properties (i) and (ii) specified in step 303. Let K be an arbitrarily large parameter. The solution of the following nonlinear integer optimization model would provide an equitable solution to the Equitable Location Sensor Model as formulated by ESLM. The new model is referred to as the Equitable Sensor Location Model—Executable (ESLM-EX).

ESLM-EX $$V^K = \min_x \left\{ \sum_{i \in N} \frac{1}{[\varepsilon + f_i(x)]^K} \right\} \quad (5.a)$$

so that $$\sum_{j \in S} x_j = P, \quad (5.b)$$

$$x_j = 0, 1, \ j \in S, \quad (5.c)$$

where $\varepsilon$ is an arbitrarily small parameter introduced for computational purposes to avoid infinite terms in the objective function (5.a). When K is very large, ESLP-EX will provide an equitable solution, or, equivalently, a lexicographic maximin solution. Suppose $f_1(x) < f_2(x)$. Then, property (i) in step 303 implies that for large K the term for i=1 in objective function (5.a) is significantly larger than the term for i=2 in objective function (5.a). This argument applies to every pair of nodes in N. Property (ii) in step 303 implies that the improvement in the i-th term in the objective function (5.a) is larger when $x^1$ is increased to $x^{1+}$ than the improvement realized when $x^2$ is increased to $x^{2+}$. Thus, for a sufficiently large value K, an optimal solution of ESLM-EX would be the lexicographically largest feasible vector of the performance function values sorted in non-decreasing order. Note that even a small value of K (e.g., K≧4) the solution of ESLM-EX is expected to provide a near-equitable solution. An appropriate value of K can be determined through experimentation.

Computation of Equitable Solution (Step 306)

The present invention generates model ESLM-EX, whose solution provides an equitable solution to the Equitable Sensor Location Model, where the solution can be computed by various existing state-of-the-art optimization methods. These include, but are not limited to, dynamic programming and meta-heuristics such as simulated annealing and tabu search. The book by T. Ibaraki and N. Katoh, "*Resource Allocation Problems: Algorithmic Approaches*", The MIT Press, Cambridge, Mass., 1988 provides in Section 3.2 a dynamic programming algorithm that solves ESLM-EX. C. R. Reeves (editor), "*Modern Heuristic Techniques for Combinatorial Problems*", Halsted Press an imprint of John Wiley, New York, 1993, presents in his book tutorials on various meta-heuristics, including on simulated annealing and tabu search.

ESLM-EX may be used in a static (a single period) or a dynamic (multi-period) environment. Consider a dynamic environment where, for example, data is collected from all sensors every 15 minutes and the data analysis repeatedly suggests that no objects are present at any of the locations. Still, after some time, e.g., after a day, it is desirable to change some of the sensor locations so that an adversary would not be able to learn where sensors are located. This can be done, for example, by changing the set S of possible sensor locations and resolving ESLM-EX. The changes in the set S can be selected using some randomized selection scheme. In some applications, sensors are installed at every node in S, however, at every point in time, only P<|S| of these sensors are activated due to operational constraints. In such applications, the locations of activated sensors would be changed periodically by resolving ESLM-EX, wherein the set S is changed using some randomized selection scheme.

Finally, suppose the data analysis suggests that there is a concern that objects are present at a subset of the locations, say at subset of nodes $N^{present}$. ESLM-EX can then be applied to a new network representation that includes explosion of the nodes in $N^{present}$ so that each node in the new network would represent a much smaller area than in the original network. ESLM-EX would then find an equitable solution to place a limited number of a second type of sensors, e.g., mobile sensors, in the area represented by the new network in order to collect more accurate observations of the area under suspicion.

The algorithms and modeling described above are capable of being performed on an instruction execution system, apparatus, or device, such as a computing device. The algorithms themselves may be contained on a computer-readable medium that can be any means that can contain, store, communicate, propagate, or transport the program for use by or in connection with an instruction execution system, apparatus, or device, such as a computer.

While there has been described and illustrated a method for the optimal placement of a limited number of sensors at selected locations in order to achieve equitable coverage levels to all locations, it will be apparent to those skilled in the art that variations and modifications are possible without deviating from the broad teachings and scope of the present invention which shall be limited solely by the scope of the claims appended hereto.

What is claimed is:

1. A method for a computing device determining placement of a plurality of sensors in a specified area wherein the placement of the plurality of sensors provides coverage, the method comprising:

generating by the computing device a network representation of the specified area, wherein the network representation comprises a plurality of nodes and directed links connecting node-pairs of the plurality of nodes, wherein a node represents at least one of a sub-area within a node set N that includes sub-areas to be monitored or a sub-area within a node set S that includes sub-areas suitable for placement of one of the plurality of sensors, a directed link represents a surveillance relation among a node-pair, and a node-pair comprises a first node suitable for placement of one of the plurality of sensors and an associated second node that is to be monitored;

generating by the computing device a sensor location model as a lexicographic maximin model that provides a lexicographically largest ordered vector whose elements represent the coverage levels provided to the nodes that are to be monitored, wherein the model specifies coverage for the nodes that are to be monitored; and generating by the computing device a nonlinear integer model from the sensor location model, wherein the nonlinear integer model is configured to provide sensor placement locations that provide a desirable amount of coverage to the nodes that are to be monitored.

2. The method as set forth in claim 1, wherein generating by the computing device the sensor location model comprises generating by the computing device a sensor location model having constraints that specify a limit on a number of sensors available for placement.

3. The method as set forth in claim 1, wherein the directed links extend from a node in the node set S to an associated node in the node set N and indicate that the node in the node set S is configured to monitor the associated node in the node set N.

4. The method as set forth in claim 3, further comprising generating by the computing device surveillance performance functions that compute a coverage level offered to at least one specified node in the node set N as a function of one or more sensors that are placed at nodes in the node set S that are configured to monitor the at least one specified node in the node set N.

5. The method as set forth in claim 4, further comprising characterizing by the computing device sensors in terms of their properties, including probabilities of object detection and probabilities of false alarms; and wherein generating surveillance performance functions comprises generating surveillance performance functions that use as an input the properties of the sensors.

6. The method as set forth in claim 1, wherein the sensor placement locations are generated by the computing device optimizing the nonlinear integer model.

7. A method for a computing device determining placement of a plurality of sensors P in a node set S that provides coverage to nodes in a node set N, the method comprising:

generating by a computing device surveillance performance functions, $f_i(x)$ for i∈N for nodes i in the node set N, for the coverage provided to the nodes i as a function of the plurality of sensors placed at nodes in the node set S that monitor respective nodes in node set N;

generating by the computing device a sensor location model as a lexicographic maximin model that provides a lexicographically largest ordered vector whose elements represent the coverage provided to the nodes in the node set N, the sensor location model provided by:

$$V^K = \min_x \left\{ \sum_{i \in N} \frac{1}{[\varepsilon + f_i(x)]^K} \right\} \text{ so that } \sum_{j \in S} x_j = P, \ x_j = 0, 1, \text{ and } j \in S,$$

wherein ε is an arbitrarily small parameter so that the sensor location model avoids infinite terms and K is greater than or equal to 4.

8. The method as set forth in claim 7, wherein generating by the computing device the surveillance performance functions comprises generating by the computing device surveillance performance functions having the following properties:

for a given node i, the surveillance performance function $f_i(x)$ is increasing with variables j ∈ J(i), where nodes in the node set S are indexed by j and J(i) is a subset of nodes in the node set S that can monitor the given node i; and $f_i(x)$ is concave on the integer values of $x_j$ for j ∈ J(i).

9. A system for determining placement of a plurality of sensors in a specified area wherein the placement of the plurality of sensors provides coverage, the system comprising a computing device comprising:

means for generating a network representation of the specified area, wherein the network representation comprises a plurality of nodes and directed links connecting the plurality of nodes, wherein a node represents at least one of a first sub-area that is to be monitored or a second sub-area suitable for placement of one of the plurality of sensors, and wherein a directed link represents surveillance relations among a node-pair, wherein a node-pair comprises a first node in the first sub-area and an associated second node in the second sub-area;

the plurality of sensors, wherein the plurality of sensors are characterized in terms of their properties, including at least probabilities of object detection and probabilities of false alarms;

means for generating surveillance performance functions for coverage provided to nodes that are to be monitored, as a function of the locations of sensors that monitor the nodes that are to be monitored; and means for generating a sensor location model as a lexicographic maximin model that provides a lexicographically largest ordered vector whose elements represent the coverage provided to the nodes that are to be monitored, wherein the model specifies coverage for the nodes that are to be monitored.

10. A system for determining placement of a plurality of sensors in a specified area wherein the placement of the plurality of sensors provides coverage, the system comprising a computing device comprising:

means for generating a network representation of the specified area, the network representation comprising a plurality of nodes and a plurality of directed links connecting the plurality of nodes, wherein a node represents at least one of a first sub-area that is to be monitored or a second sub-area suitable for placement of one of the plurality of sensors, and wherein a directed link represents surveillance relations among a node-pair, wherein a node-pair comprises a first node in the first sub-area and an associated second node in the second sub-area;

means for generating surveillance performance functions for the coverage provided to nodes that are to be monitored as a function of the locations of sensors that monitor the nodes that are to be monitored; and means for generating a sensor location model as a lexicographic maximin optimization model that provides a lexicographically largest ordered vector whose elements represent the coverage provided to the nodes that are to be monitored, wherein the model specifies coverage for the nodes that are to be monitored.

11. The system as set forth in claim 10, wherein the sensor location model comprises constraints that specify a limit on a number of sensors that are available for placement.

12. The system as set forth in claim 10, wherein the plurality of nodes comprise a node set N representing sub-areas that are to be monitored, a node set S representing locations suitable for placement of one of the plurality of sensors, and at least one directed link from a node in the node set S to an associated node in the node set N, wherein the at least one directed link indicates that the node in the node set S is configured to monitor the associated node in the node set N.

13. The system as set forth in claim 12, wherein the surveillance performance functions compute the coverage level offered to a node in the node set N as a function of sensors placed at nodes in the node set S that monitor the node in the node set N.

14. The system as set forth in claim 13, wherein the plurality of sensors are characterized in terms of their properties, including at least probabilities of object detection and probabilities of false alarms, and
wherein the surveillance performance functions use as input the properties of the plurality of sensors.

15. The system as set forth in claim 10, the computing device further comprising means for generating a nonlinear integer model generated from the sensor location model wherein the nonlinear integer model is configured to provide sensor placement locations that provide a desirable amount of coverage to the nodes that are to be monitored.

16. The system as set forth in claim 15, wherein the sensor placement locations are generated by optimizing the nonlinear integer model.

17. A system for determining placement of a plurality of sensors in a set of nodes S that provides coverage to nodes in a set of nodes N, the system comprising a computing device comprising:
means for generating surveillance performance functions for the coverage provided to the nodes in the node set N as a function of the plurality of sensors placed at nodes in the node set S that monitor respective nodes in the node set N;
means for generating a sensor location model as a lexicographic maximin optimization model that provides a lexicographically largest ordered vector whose elements represent the coverage provided to the nodes in the node set N, wherein the sensor location model specifies coverage to the nodes in the node set N; and
means for generating a revised sensor location model in response to changing at least one location of the nodes in the node set S.

18. The system as set forth in claim 17, the computing device further comprising means for generating a nonlinear integer model generated from the revised sensor location model, wherein the nonlinear integer model is configured to provide a set of possible sensor locations.

19. A non-transitory computer readable medium having instructions for determining placement of a plurality of sensors in a specified area to provide coverage stored thereon, the instructions comprising:
instructions to generate a network representation of the specified area, wherein the network representation comprises a plurality of nodes and directed links connecting node-pairs of the plurality of nodes, wherein a node represents at least one of a sub-area within a node set N that includes sub-areas to be monitored or a sub-area within a node set S that includes sub-areas suitable for placement of one of the plurality of sensors, a directed link represents a surveillance relation among a node-pair, and a node-pair comprises a first node suitable for placement of one of the plurality of sensors and an associated second node that is to be monitored;
instructions to generate a sensor location model as a lexicographic maximin model that provides a lexicographically largest ordered vector whose elements represent the coverage levels provided to the nodes that are to be monitored, wherein the model specifies coverage for the nodes that are to be monitored; and
instructions to generate a nonlinear integer model from the sensor location model, wherein the nonlinear integer model is configured to provide sensor placement locations that provide a desirable amount of coverage to the nodes that are to be monitored.

20. The non-transitory computer readable medium of claim 19, wherein the instructions to generate the sensor location model comprises instructions to generate a sensor location model comprising constraints that specify a limit on a number of sensors available for placement.

21. The non-transitory computer readable medium of claim 19, wherein the directed links extend from a node in the node set S to an associated node in the node set N and indicate that the node in the node set S is configured to monitor the associated node in the node set N.

22. The non-transitory computer readable medium of claim 21, the instructions further comprising instructions to generate the surveillance performance functions that compute a coverage level offered to at least one specified node in the node set N as a function of one or more sensors that are placed at nodes in the node set S that are configured to monitor the at least one specified node in the node set N.

23. The non-transitory computer readable medium of claim 22, the instructions further comprising instructions to characterize sensors in terms of their properties, including at least probabilities of object detection and probabilities of false alarms; and
wherein the instructions to generate surveillance performance functions comprises instructions to generate surveillance performance functions that use as input the properties of the sensors.

24. The non-transitory computer readable medium of claim 19, wherein the instructions to generate a nonlinear integer model further comprise instructions to generate sensor placement locations by optimizing the nonlinear integer model.

25. A non-transitory computer readable medium having instructions for determining placement of a plurality of sensors P in a node set S that provides coverage levels to nodes in a node set N stored thereon, the instructions comprising:
instructions to generate surveillance performance functions, $f_i(x)$ for $i \in N$ for nodes i in the node set N, for the coverage provided to the nodes i as a function of the plurality of sensors placed at nodes in the node set S that monitor respective nodes in node set N;
instructions to generate a sensor location model as a lexicographic maximin model that provides a lexicographically largest ordered vector whose elements represent the coverage provided to the nodes in the node set N, the sensor location model provided by:

$$V^K = \min_x \left\{ \sum_{i \in N} \frac{1}{[\varepsilon + f_i(x)]^K} \right\} \text{ so that } \sum_{j \in S} x_j = P, \ x_j = 0, 1, \text{ and } j \in S,$$

wherein $\varepsilon$ is an arbitrarily small parameter so that the sensor location model avoids infinite terms and K is greater than or equal to 4.

26. The non-transitory computer readable medium of claim 25, wherein the instructions to generate surveillance performance functions further comprise instructions to generate surveillance performance functions having the following properties:
for a given node i, the surveillance performance function $f_i(x)$ is increasing with variables $j \in J(i)$, where nodes in the node set S are indexed by j and J(i) is a subset of nodes in the node set S that can monitor the given node i; and
$f_i(x)$ is concave on the integer values of $x_j$ for $j \in J(i)$.

27. The method of claim 1 further comprising generating surveillance performance functions for coverage levels provided respectively to the nodes that are to be monitored as a function at least in part of the locations of sensors that monitor the nodes that are to be monitored.

28. The method of claim 1 wherein the sensor location model comprises decision variables that represent sensor placement decisions.

29. The system of claim 9, the computing device further comprising means for generating a nonlinear integer model from the sensor location model, wherein the nonlinear integer model specifies placement of the plurality of sensors that provides a desirable amount of coverage levels to the nodes that are to be monitored.

30. The system of claim 10, wherein the sensor location model comprises decision variables that represent sensor placement decisions.

31. The method of claim 1 further comprising characterizing the plurality of sensors in terms of their properties, including probabilities of object detection and probabilities of false alarms.

32. The non-transitory computer readable medium of 19 further comprising instructions to characterize the plurality of sensors in terms of their properties, including probabilities of object detection and probabilities of false alarms.

33. The non-transitory computer readable medium of claim 19, the instructions further comprising instructions to generate surveillance performance functions for coverage levels provided respectively to the nodes that are to be monitored as a function at least in part of the locations of sensors that monitor the nodes that are to be monitored.

34. The non-transitory computer readable medium of claim 19 wherein the sensor location model comprises decision variables that represent sensor placement decisions.

* * * * *

UNITED STATES PATENT AND TRADEMARK OFFICE
CERTIFICATE OF CORRECTION

| | |
|---|---|
| PATENT NO. | : 8,019,576 B2 |
| APPLICATION NO. | : 11/725794 |
| DATED | : September 13, 2011 |
| INVENTOR(S) | : Luss |

It is certified that error appears in the above-identified patent and that said Letters Patent is hereby corrected as shown below:

Title page, item (56), under "Other Publications", in Column 2, Line 3, delete "Netowrk" and insert -- Network --.

Title page, item (56), under "Other Publications", in Column 2, Line 7, delete "Netowrks" and insert -- Networks --.

Column 14, Line 5, in Claim 32, delete "of 19" and insert -- of claim 19 --.

Signed and Sealed this
Thirteenth Day of March, 2012

David J. Kappos
*Director of the United States Patent and Trademark Office*